United States Patent
Aaron et al.

(10) Patent No.: US 8,880,666 B2
(45) Date of Patent: Nov. 4, 2014

(54) METHOD, POLICY REQUEST ROUTER, AND MACHINE-READABLE HARDWARE STORAGE DEVICE TO SELECT A POLICY SERVER BASED ON A NETWORK CONDITION TO RECEIVE POLICY REQUESTS FOR A DURATION

(75) Inventors: Jeffrey A. Aaron, Atlanta, GA (US); Robert C. Streijl, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 663 days.

(21) Appl. No.: 12/915,672

(22) Filed: Oct. 29, 2010

(65) Prior Publication Data

US 2012/0110128 A1 May 3, 2012

(51) Int. Cl.

| | |
|---|---|
| G06F 15/16 | (2006.01) |
| G06F 15/173 | (2006.01) |
| G06F 17/00 | (2006.01) |
| H04L 29/08 | (2006.01) |
| H04L 12/813 | (2013.01) |
| H04L 29/06 | (2006.01) |
| H04L 12/911 | (2013.01) |
| H04L 12/801 | (2013.01) |
| H04L 12/24 | (2006.01) |
| H04L 12/725 | (2013.01) |
| H04L 12/927 | (2013.01) |
| H04W 4/02 | (2009.01) |

(52) U.S. Cl.
CPC .............. *H04L 67/101* (2013.01); *H04L 47/20* (2013.01); *H04L 67/1036* (2013.01); *H04L 47/781* (2013.01); *H04L 47/15* (2013.01); *H04L 41/028* (2013.01); *H04L 41/0893* (2013.01); *H04L 65/1069* (2013.01); *H04L 67/1008* (2013.01); *H04L 67/1029* (2013.01); *H04L 67/1027* (2013.01); *H04L 65/80* (2013.01); *H04L 45/302* (2013.01); *H04L 47/805* (2013.01); *H04L 67/1021* (2013.01); *H04W 4/021* (2013.01)

USPC ........... 709/223; 709/219; 709/226; 709/228; 726/1

(58) Field of Classification Search
CPC ... H04L 67/101; H04L 47/20; H04L 67/1036; H04L 47/781; H04L 47/15; H04L 41/028; H04L 41/0893; H04L 65/80; H04L 45/302; H04L 65/1069; H04L 47/805; H04L 67/1008; H04L 67/1029; H04L 67/1027; H04L 67/1021; H04W 4/021
USPC ....................... 709/219, 223, 226, 228; 726/1
See application file for complete search history.

(56) References Cited

U.S. PATENT DOCUMENTS

| | | | | |
|---|---|---|---|---|
| 5,341,477 A | * | 8/1994 | Pitkin et al. .................. | 709/226 |
| 5,751,963 A | * | 5/1998 | Umetsu ......................... | 709/223 |
| 6,157,955 A | | 12/2000 | Narad et al. | |
| 6,167,445 A | | 12/2000 | Gai et al. | |

(Continued)

*Primary Examiner* — Daniel C Murray
(74) *Attorney, Agent, or Firm* — Hanley, Flight & Zimmerman, LLC.

(57) ABSTRACT

Example methods, apparatus and articles of manufacture to route policy requests are disclosed. A disclosed example method includes receiving, at a policy request router, a policy request from a policy requestor, applying, at the policy request router, a rule to a parameter representing a network condition to select a policy server for the policy request, and sending from the policy request router to the policy requestor an identifier representing the policy server, the policy requestor to send the policy request to the policy server based on the identifier, the policy server to enforce a policy associated with the policy request.

18 Claims, 5 Drawing Sheets

(56) References Cited

U.S. PATENT DOCUMENTS

| | | | |
|---|---|---|---|
| 6,170,009 B1 | 1/2001 | Mandal et al. | |
| 6,411,986 B1* | 6/2002 | Susai et al. | 709/203 |
| 6,587,466 B1 | 7/2003 | Bhattacharya et al. | |
| 6,678,835 B1* | 1/2004 | Shah et al. | 714/4.12 |
| 6,735,701 B1* | 5/2004 | Jacobson | 726/1 |
| 6,738,908 B1* | 5/2004 | Bonn et al. | 726/4 |
| 6,775,280 B1 | 8/2004 | Ma et al. | |
| 6,820,121 B1* | 11/2004 | Callis et al. | 709/225 |
| 6,847,609 B1* | 1/2005 | Sarnikowski et al. | 370/229 |
| 6,944,183 B1* | 9/2005 | Iyer et al. | 370/466 |
| 6,954,780 B2* | 10/2005 | Susai et al. | 709/203 |
| 7,260,060 B1 | 8/2007 | Abaye et al. | |
| 7,290,028 B2* | 10/2007 | Brabson et al. | 709/203 |
| 7,337,465 B2* | 2/2008 | Kiyoto et al. | 726/1 |
| 7,437,441 B1* | 10/2008 | Drew et al. | 709/223 |
| 7,552,235 B2 | 6/2009 | Chase et al. | |
| 7,685,279 B2* | 3/2010 | Miltonberger et al. | 709/225 |
| 7,822,871 B2* | 10/2010 | Stolorz et al. | 709/238 |
| 8,042,148 B2* | 10/2011 | Andreasen et al. | 726/1 |
| 8,584,226 B2* | 11/2013 | Kudla et al. | 726/13 |
| 8,645,517 B2* | 2/2014 | Stolorz et al. | 709/223 |
| 8,665,712 B2* | 3/2014 | Ramaswamy et al. | 370/229 |
| 2002/0046284 A1* | 4/2002 | Brabson et al. | 709/228 |
| 2002/0059428 A1* | 5/2002 | Susai et al. | 709/227 |
| 2002/0065922 A1* | 5/2002 | Shastri | 709/227 |
| 2002/0087657 A1* | 7/2002 | Hunt | 709/217 |
| 2002/0138551 A1* | 9/2002 | Erickson | 709/203 |
| 2002/0147822 A1* | 10/2002 | Susai et al. | 709/229 |
| 2003/0065762 A1* | 4/2003 | Stolorz et al. | 709/223 |
| 2003/0229501 A1* | 12/2003 | Copeland et al. | 705/1 |
| 2004/0039803 A1* | 2/2004 | Law | 709/223 |
| 2004/0073596 A1* | 4/2004 | Kloninger et al. | 709/200 |
| 2004/0181689 A1* | 9/2004 | Kiyoto et al. | 713/201 |
| 2005/0240990 A1* | 10/2005 | Trutner et al. | 726/11 |
| 2005/0289618 A1* | 12/2005 | Hardin | 725/95 |
| 2006/0010252 A1* | 1/2006 | Miltonberger et al. | 709/245 |
| 2006/0167975 A1* | 7/2006 | Chan et al. | 709/203 |
| 2006/0294575 A1* | 12/2006 | Rogers | 726/1 |
| 2007/0226775 A1* | 9/2007 | Andreasen et al. | 726/1 |
| 2007/0245409 A1* | 10/2007 | Harris et al. | 726/5 |
| 2008/0025261 A1* | 1/2008 | Riley | 370/331 |
| 2008/0070594 A1* | 3/2008 | Barber | 455/458 |
| 2008/0147866 A1* | 6/2008 | Stolorz et al. | 709/226 |
| 2008/0215718 A1* | 9/2008 | Stolorz et al. | 709/223 |
| 2008/0263180 A1* | 10/2008 | Hurst et al. | 709/219 |
| 2008/0276304 A1 | 11/2008 | Maffione et al. | |
| 2009/0313372 A1 | 12/2009 | Streijl | |
| 2010/0299451 A1* | 11/2010 | Yigang et al. | 709/241 |
| 2011/0058545 A1* | 3/2011 | Eriksson | 370/389 |
| 2011/0066718 A1* | 3/2011 | Susai et al. | 709/224 |
| 2011/0145386 A1* | 6/2011 | Stolorz et al. | 709/223 |
| 2011/0294518 A1* | 12/2011 | Siomina et al. | 455/456.1 |
| 2011/0314144 A1* | 12/2011 | Goodman | 709/224 |
| 2012/0084342 A1* | 4/2012 | Brown et al. | 709/203 |
| 2012/0151056 A1* | 6/2012 | Sporel et al. | 709/225 |
| 2013/0036215 A1* | 2/2013 | Kupinsky et al. | 709/223 |
| 2013/0086278 A1* | 4/2013 | Schmidt | 709/231 |
| 2013/0298206 A1* | 11/2013 | Brown et al. | 726/4 |
| 2013/0311549 A1* | 11/2013 | Abdulkadev et al. | 709/203 |
| 2014/0029420 A1* | 1/2014 | Jeong et al. | 370/229 |

* cited by examiner

METHOD, POLICY REQUEST ROUTER, AND MACHINE-READABLE HARDWARE STORAGE DEVICE TO SELECT A POLICY SERVER BASED ON A NETWORK CONDITION TO RECEIVE POLICY REQUESTS FOR A DURATION

FIELD OF THE DISCLOSURE

This disclosure relates generally to policy requests, and, more particularly, to methods, apparatus and articles of manufacture to route policy requests.

BACKGROUND

In general, a policy represents and/or defines one or more rules that are applied to determine present and future decisions and/or actions. In communication networks and/or systems, policies represent and/or define rules that are applied to administer, manage and/or control access to communication resources.

DETAILED DESCRIPTION

Example methods, apparatus and articles of manufacture to route policy requests are disclosed. A disclosed example method includes receiving, at a policy request router, a policy request from a policy requestor, applying, at the policy request router, a rule to a parameter representing a network condition to select a policy server for the policy request, and sending from the policy request router to the policy requestor an identifier representing the policy server, the policy requestor to send the policy request to the policy server based on the identifier, the policy server to enforce a policy associated with the policy request.

A disclosed example policy request routing apparatus includes a communication module to receive a policy request from a policy requestor, and a decision engine to apply a rule to a value representing a network condition to select a policy server for the policy request, and send from the policy request router to the policy requestor an identifier representing the policy server, the policy requestor to send the policy request to the policy server based on the identifier, the policy server to enforce a policy associated with the policy request.

Another disclosed example method includes sending a policy request to a policy request router, receiving from the policy request router an identifier representing a policy server, and sending the policy request to the policy server based on the identifier, the policy server to enforce a policy associated with the policy request.

A disclosed example policy request apparatus includes a computer-readable storage medium to store a provisioned address of a policy request router, and a policy request routing module to send a policy request to the policy request router based on the provisioned address, receive from the policy request router an identifier representing a policy server, and send the policy request to the policy server based on the received identifier, the policy server to enforce a policy associated with the policy request.

Figure 1:
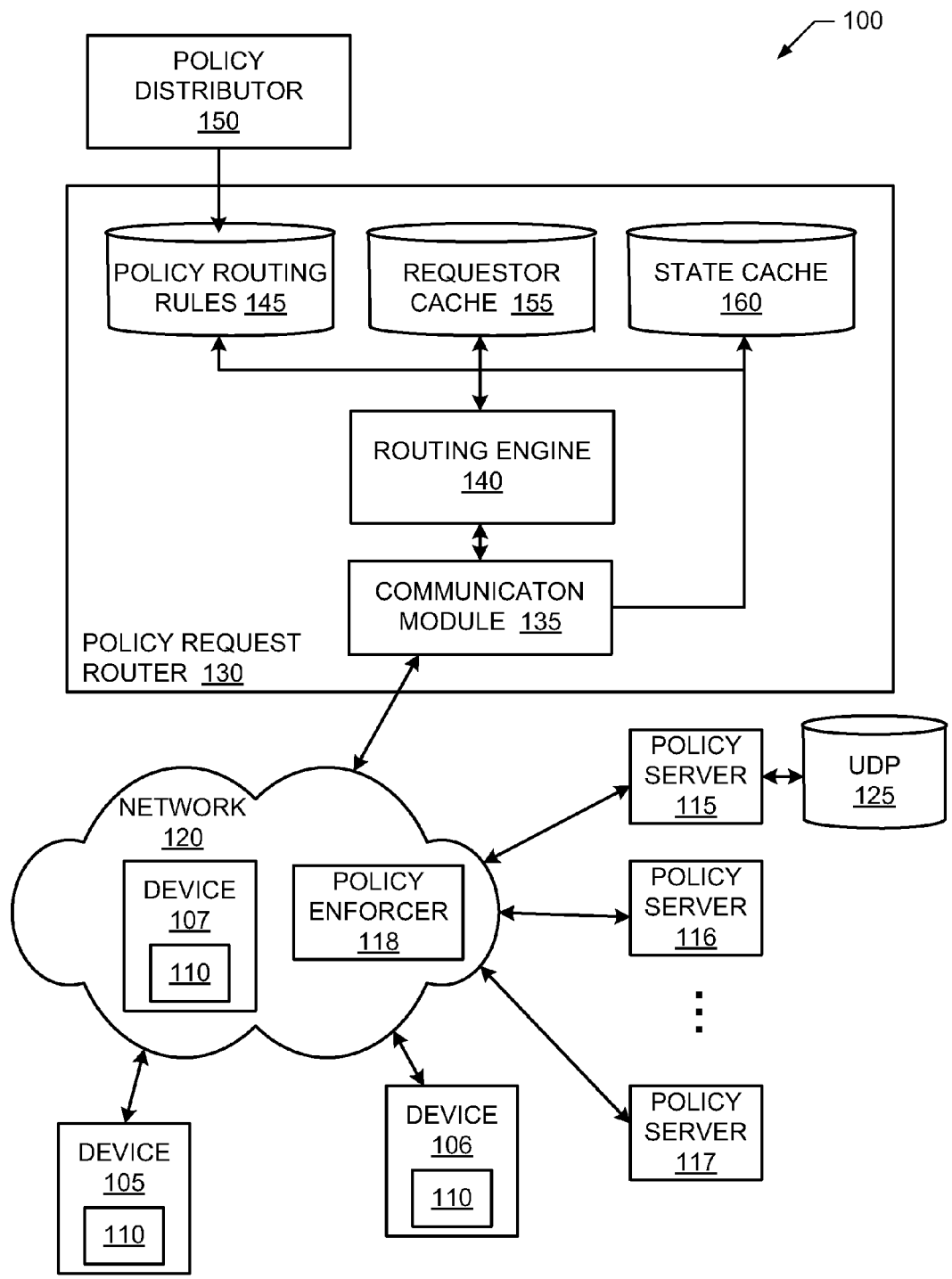
FIG. 1 is a schematic illustration of an example communication system implemented in accordance with the teachings of this disclosure.

FIG. 1 illustrates an example communication system 100. To implement, apply and/or utilize policies, the example communication system 100 of FIG. 1 implements any number and/or type(s) of communication devices 105-107 including a respective policy requestor 110, any number and/or type(s) of policy servers 115-117, and any number and/or type(s) of policy enforcers 118. While in FIG. 1 the policy requestors 110, the policy servers 115-117 and the policy enforcers 118 are depicted separately, in some examples, a particular communication device may implement any combination of a policy requestor 110, a policy enforcer 118, a policy server 115-117, and a policy enforcer 118. Further, a policy requestor 110, a policy server 115-117 and a policy enforcer 118 may be communicatively coupled via a transport plane, a signaling plane and/or a control plane of the example communication system 100.

In the illustrated example of FIG. 1, the communication devices 105-107 of FIG. 1 are communicatively coupled to the example policy servers 115-117 and the policy enforcer 118 via any number and/or type(s) of public and/or private communication network(s) 120. The example network 120 includes transport, signaling and/or control planes. The example policy servers 115-117 of FIG. 1 make policy decisions for or on behalf of other network or communication devices of the communication system 100, such as the example devices 105-107 and/or the example policy enforcer 118. A policy requestor 110 sends a policy request to a policy server 115-117 to trigger the policy server 115-117 to apply one or more policies for and/or on behalf of the device 105-107 associated with the policy requestor 110. Example policies that may be applied include, but are not limited to, quality of service (QoS) policies, security policies, remote access policies, and/or user authentication policies. For example, the policy requestor 110 of the example device 105 may send a network access request to one of the policy servers 115-117 to authenticate and/or authorize a user associated with the device 105 for access to the communication system 100.

Example communication devices 105-107 include, but are not limited to, a wireless user endpoint (e.g., a smartphone), a session border controller (SBC), an application or service element (e.g., a server, a module, etc.), a gateway general packet radio service (GPRS) support node (GGSN), a broadband remote access server (BRAS), a digital subscriber line access multiplexer (DSLAM), a feature server, a call session control function server, a residential gateway (RG) and/or any other number and/or type(s) of home network and/or communication devices. A communication device 105-107 may be implemented as hardware or any combination of hardware, software and firmware.

In general, policy enforcers 118 are implemented at, in and/or by network elements that transport user data packets, signaling packets and/or control packets. Example policy enforcers 118 include, but are not limited to, an SBC, an application or service element (e.g., a server, a module, etc.), a GGSN, a BRAS, a DSLAM, a media gateway, a feature server and/or a call session control function server. In some examples, a policy enforcer 118 comprises a logical entity embodied as machine-accessible instructions and executing on one or more processors of, for example, a server, router, gateway, control, signaling or any other communication service providing device.

Example policy servers 115-117 include, but are not limited to, a policy and charging rules function (PCRF), a service policy decision function (S-PDF), a policy decision functional element (PD-FE), or any other centralized server and/or workstation, and/or distributed servers and/or workstations. In some examples, a policy server 115-117 comprises a policy decision function (PDF) or a policy decision point (PDP) implemented as a logical entity embodied as machine-accessible instructions and executing on one or more processors of, for example, a server, router, gateway or any other communication service providing device. As shown in FIG. 1, a policy server 115-117 may query and/or consult a user policy database (UPD) 125 such as a subscription profile repository (SPR), a home subscriber server (HSS) and/or a common customer profile (CCP) during application of a policy.

Traditionally, the policy server 115-117 to which a policy requestor 110 sends a particular type of policy request is statically provisioned, associated with and/or configured into the policy requestor 110 and/or into the device 105-107 associated with the policy requestor 110. However, as the size of communication networks grow and/or the number of policies to be applied increases, the static configuration/association or assignment of policy servers 115-117 becomes impractical. Moreover, the static configuration or assignment/association of policy requestors 110 to policy servers 115-117 does not accommodate changing network and/or policy server states and/or conditions including, for example, downtime during scheduled, unexpected maintenance and/or troubleshooting that may prevent a policy requestor 110 from being able to communicate with its assigned policy server(s) 115-117.

To overcome at least these problems, the example communication system 100 of FIG. 1 includes a policy request router 130. While a single policy request router 130 is depicted in FIG. 1, a communication system may include more than one policy request router 130. Rather than the traditional approach of a policy requestor 110 being statically configured to a particular policy server 115-117, a routing module 205 of the example policy requestors 110 of FIG. 1 (FIG. 2) sends policy requests to the example policy request router 130. In some examples, an address, domain name and/or uniform resource locator (URL) for the policy request router 130 is stored in a non-volatile memory and/or storage device 210 (FIG. 2) of the policy requestor 110.

To allow the policy request router 130 to communicate with the example policy requestors 110, the example policy request router 130 of FIG. 1 includes any number and/or type(s) of communication modules 135. To make policy routing decisions, the example policy request router 130 of FIG. 1 includes a routing engine 140. When a policy request is received from a policy requestor 110 via the example communication module 135, the example routing engine 140 of FIG. 1 applies one or more policy routing rules 145 to determine or select a target policy server 115-117 for the policy request. The example routing engine 140 sends, via the communication module 135, a response to the policy requestor 110 identifying the selected policy server 115-117. The routing module 205 subsequently sends the policy request to the identified policy server 115-117 to trigger application of one or more policies associated with the policy request. Alternatively, the routing engine 140 forwards the policy request to the selected target policy server 115-117 on behalf of the policy requestor 110. As described below, a policy request belonging to the same policy realm and/or same policy domain may be sent to the identified policy server 115-117 by the policy requestor 110 without having to consult the policy request router 130. As used herein, a policy realm refers or corresponds to a usage area or a policy type, and a policy domain refers or corresponds to any other sort of policy division or categorization. In some examples, policy realms and/or policy domains correspond to network realms and/or network domains. In some examples, the routing engine 140 identifies the policy server 115-117 to the policy requestor 110 by providing at least one of a URL, a domain name, or an Internet protocol (IP) address for the selected policy server 115-117. The policy routing rules 145 applied by the routing engine 140 are different from the policies applied by the policy server 115-117 and/or the policy enforcer 118. In some examples, a policy requestor 110 and/or a policy server 115-117 may exchange any number and/or type(s) of additional or alternative messages such as a keep-alive message, a backoff message, an ACK message, etc.

The example routing engine 140 of FIG. 1 applies one or more of the example policy routing rule(s) 145 to, for example, a policy type or policy realm associated with the policy request (e.g., QoS, security, authentication, business support system (BSS)/operation support system (OSS), content delivery network (CDN), application, etc.), a policy domain associated with the policy request (e.g., a location, a geographic area, a functional area, a technology area, a business area, a customer type, a customer group, a vendor or set of vendors, a technology or set of technologies, an IP address, an IP network, an IP subnet, etc.), a network condition (e.g., link availability, bandwidth availability, etc.), a policy server 115-117 condition (e.g., load, available memory, etc.) etc. to dynamically select the target policy server 115-117 for the policy request. As used herein the term "network condition" refers to any number and/or type(s) of parameters, values, flags and/or indicators that individually or collectively represent an operational state of the network 120 at any or all of a transport plane, a signaling plane and/or a control plane. A network condition may represent whether or not any or all of a transport plane, a signaling plane or a control plane of the network 120 are operating as intended, and/or characterize how well a transport plane, a signaling plane or a control plane of the network 120 are operating. A network condition may, for example, represent the state of logical and/or physical devices, interfaces, routes, and/or communication links. Example network conditions include, but are not limited to, link operational, link down, link up, link available, bandwidth availability, server up, server down, server load, server memory consumption, a security state, an application state, and/or a service state. The example policy routing rules 145 of FIG. 1 may be expressed using if-then, input-while-then, and/or event-condition-action (ECA) expressions. The "if," "input," "while," "event," "condition" and/or "action" portions of such rules may include more than one sub-expression. Further, such portions or sub-expressions may include computations, comparisons, algorithms and/or thresholds. An example input-while-then rule 145 is "policy request corresponds to policy realm #1, while device 105-107 is in geographic area #3 and load on policy server #9 is less than L, then select policy server #9." The "while" portion of such rules distinguishes the example policy routing rules 145 from a table look-up. For example, a proxy call session control function (P-CSCF) server in an IP multimedia subsystem (IMS) network consults a static list or table to identify the serving call session control function (S-CSCF) server and the interrogating call session control function (I-CSCF) server assigned to a user endpoint device. The determination of the S-CSCF and I-CSCF servers by the P-CSCF server clearly does not depend on any dynamic network conditions, computations, comparisons, rules, algorithms or thresholds.

In some examples, the routing engine 140 implements multiple decision modes. For example, when available information is determinative, then the policy routing rules 145 are applied and result in the selection of a single target policy server 115-117. When available information is not fully determinative (e.g., the rules 145 result in the identification of multiple policy servers 115-117), the routing engine 140 selects the best target policy server 115-117 from the multiple identified policy servers 115-117. When available information is barely determinative (e.g., significant uncertainty in which policy server 115-117 to select), the routing engine 140 selects the best policy server 115-117 and notifies a management system (not shown).

Policy routing rules may be stored in, for example, a cache using any number and/or type(s) of data structure(s). The policy routing rules 145 may be implemented by any number and/or type(s) of volatile and/or non-volatile memory(-ies), memory device(s) and/or tangible computer-readable storage medium.

Rules stored in the example cache 145 of FIG. 1 may be received from any number and/or type(s) of policy distributors 150. The example policy distributor 150 of FIG. 1 implements any number and/or type(s) of graphical user interface(s) to enable a person (e.g., a technician, a network operator, etc.) to dynamically create, define, delete, and/or modify policy routing rules. The graphical user interface(s) also enable the user to update the policy routing rules cache 145 while the example policy request router 130 is operating. In some examples, the example distributor 150 of FIG. 1 provides the rules implemented by the example policy servers 115-117.

In some examples, each of the policy servers 115-117 implement different policies, although any of the policy servers 115-117 may implement more than one policy. Accordingly, the example policy request router 130 of FIG. 1 differs from a load balancer, which routes policy requests to different policy servers to balance the processing, memory and/or storage loads of the policy servers 115-117. Moreover, a load balancer forwards the policy request to the selected policy server 115-117 on behalf of the policy requestor 110, and does not return an identifier for the selected policy server 115-117 to the policy requestor 110.

Figure 2:
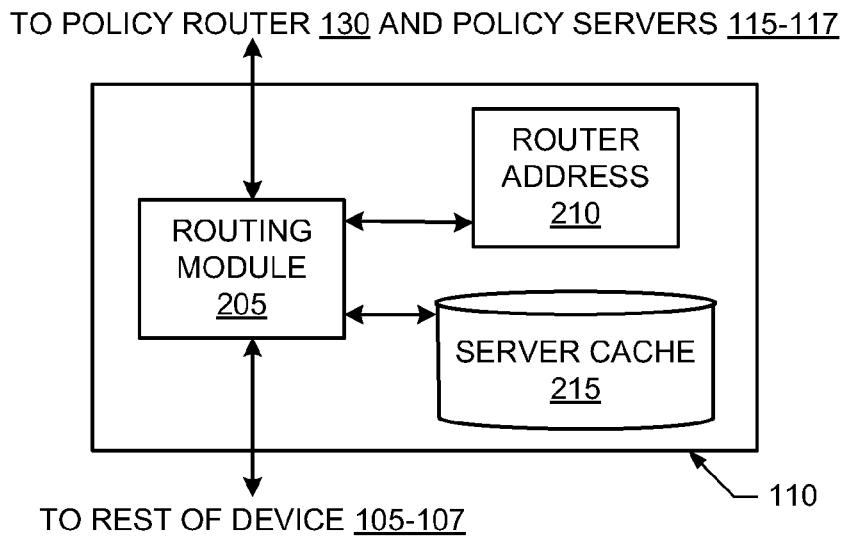
FIG. 2 illustrates an example manner of implementing any of the example policy requestors of FIG. 1.

In some examples, the routing engine 140 of FIG. 1 also returns to the policy requestor 110 a value representing a time duration or time period for which the identified policy server 115-117 may be used by the policy requestor 110 without having to consult the policy request router 130. For example, when a response is received at the routing module 205 (FIG. 2) from the routing engine 140, the routing module 205 stores the policy server identifier together with a policy domain and/or realm, and the time duration value in a cache 215 (FIG. 2). When a subsequent policy request is to be sent, a routing module 205 queries the cache 215 to determine whether the cache 215 contains an entry having a policy domain and/or policy realm corresponding to the policy request to be sent. If a cache entry is identified, the routing module 205 determines whether the time period specified in the response received from the policy request router 130 has expired. If the time period has not expired, the routing module 205 sends the policy request to the policy server 115-117 previously identified by the policy request router 130. If the time period has expired, the routing module 205 sends the policy request to the policy request router 130 to determine the policy server 115-117 for the policy request.

One or more parameters associated with the policy request (e.g., policy realm, policy domain, the policy requestor 110, etc.), the selected policy server 115-117 and the time period value (if applicable) are stored in a requestor cache 155. One or more parameters and/or values representing network state (e.g., which links are functional, which links are down, etc.), network condition (e.g., bandwidth used on each link), policy server states (e.g., operational, down, etc.) and/or policy server condition (e.g., load, memory usage, etc.) used to select a policy server 115-117 are stored in a state cache 160. Data may be stored in the example caches 155 and 160 using any number and/or type(s) of data structure(s). The example caches 155 and 160 may be implemented using any number and/or type(s) of volatile and/or non-volatile memory(-ies), memory device(s) and/or tangible computer-readable storage medium. In some examples, the communication module 135 periodically and/or aperiodically polls and/or queries the policy servers 115-117 and/or communication system devices (e.g., routers, switches, etc.) for their state and/or condition information and updates the state cache 160 accordingly.

In some examples, the routing engine 140 monitors the state cache 160 for a change in network and/or policy server state and/or condition. When a change is detected (e.g., a link failure, a policy server failure, etc.), the example routing engine 140 of FIG. 1 automatically determines which previous policy server selections stored in the requestor cache 155 need to be updated. Additionally or alternatively, the routing engine 140 queries each entry in the requestor cache 115 to identify entries that have or will soon expire. For each policy server selection needing to be changed or for each entry that need to be refreshed, the routing engine 140 applies one or more of the policy routing rules 145 based on the current state 160 to select a new policy server 115-117, updates the requestor cache 155, and automatically notifies the associated policy requestor(s) 110 of the changed policy server selection.

In some examples, the policy requestors 110 may contact the policy request router 130 for policy server 115 selections independent of and/or separately from a policy request. The routing engine 140 responds with a policy server 115-117 for each of a plurality of policy/policy realm/policy domain combinations. Additionally or alternatively, the example routing engine 140 provides to the policy requestors 110 a multicast address for each of the plurality of policy/policy realm/policy domain combinations. The policy server(s) 115-117 associated with each policy/policy realm/policy domain combination joins the associated multicast group using, for example, any past, present and/or future version of the Internet group management protocol (IGMP). When a policy requestor 110 has a policy request to send, it broadcasts the policy request to the multicast address associated with the policy request. Example methods to determine which policy server 115-117 handles the policy request and/or which response the policy requestor 110 considers is described in U.S. Publication No. 2009/0313372, entitled "Apparatus, Methods and Computer Program Products For Managing Network Elements and Associated Network Element Resources by Multiple Management Systems, filed Jun. 16, 2008. U.S. Publication No. 2009/0313372 is hereby incorporated by reference in its entirety.

While an example manner of implementing the example policy request router 130 and the example policy requestors 110 have been illustrated in FIGS. 1 and 2, one or more of the elements, processes and/or devices illustrated in FIGS. 1 and 2 may be combined, divided, re-arranged, omitted, eliminated and/or implemented in any other way. Further, the example policy request router 130, the example communication module 135, the example routing engine 140, the example policy cache 145, the example requestor cache 155, the example state cache 160, the example policy requestors 110, the example routing module 205, the example router address 210, and/or the example server cache 215 of FIGS. 1 and 2 may be implemented by hardware, software, firmware and/or any combination of hardware, software and/or firmware. Thus, for example, any of the example policy request router 130, the example communication module 135, the example routing engine 140, the example policy cache 145, the example requestor cache 155, the example state cache 160, the example policy requestors 110, the example routing module 205, the example router address 210, and/or the example server cache 215 could be implemented by the example processor platform P100 of FIG. 6 and/or one or more circuit(s), programmable processor(s), application specific integrated circuit(s) (ASIC(s)), programmable logic device(s) (PLD(s)) and/or field programmable logic device(s) (FPLD(s)), field-programmable gate array(s) (FPGA(s)), fuses, etc. When any apparatus claim of this patent incorporating one or more of these elements is read to cover a purely software and/or firmware implementation, at least one of the example policy request router 130, the example communication module 135, the example routing engine 140, the example policy cache 145, the example requestor cache 155, the example state cache 160, the example policy requestors 110, the example routing module 205, the example router address 210, and/or the example server cache 215 are hereby expressly defined to include a tangible article of manufacture such as a tangible computer-readable medium storing the firmware and/or software. Further still, any of the example policy request router 130 and/or the example policy requestors 110 of FIGS. 1 and 2 may include one or more elements, processes and/or devices in addition to, or instead of, those illustrated in FIGS. 1 and 2, and/or may include more than one of any or all of the illustrated elements, processes and devices.

As used herein, the term tangible computer-readable medium is expressly defined to include any type of computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, a magnetic storage device, a cache, and/or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 4. As used herein, the term non-transitory computer-readable medium is expressly defined to include any type of computer-readable medium and to exclude propagating signals.

Figure 3:
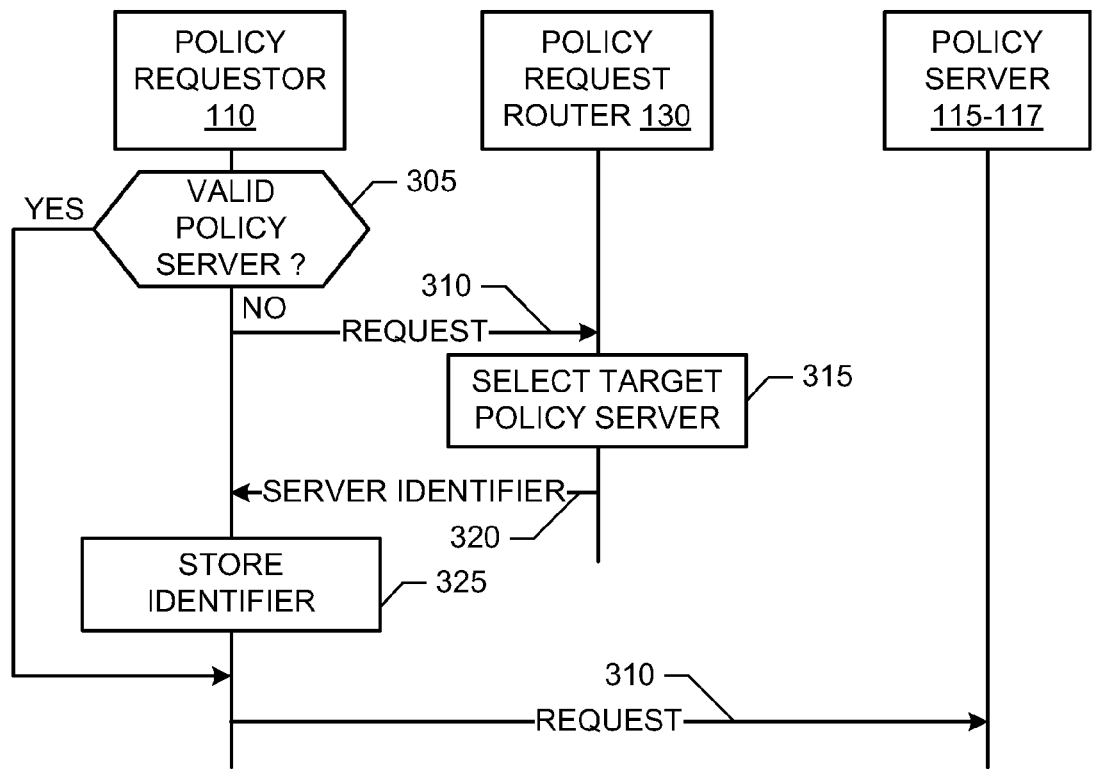
FIGS. 3-5 illustrate example interactions and example processes that may be embodied as machine-accessible instructions and executed by, for example, one or more processors to implement the example policy requestors and/or the example policy request router of FIGS. 1 and 2.
Figure 4:
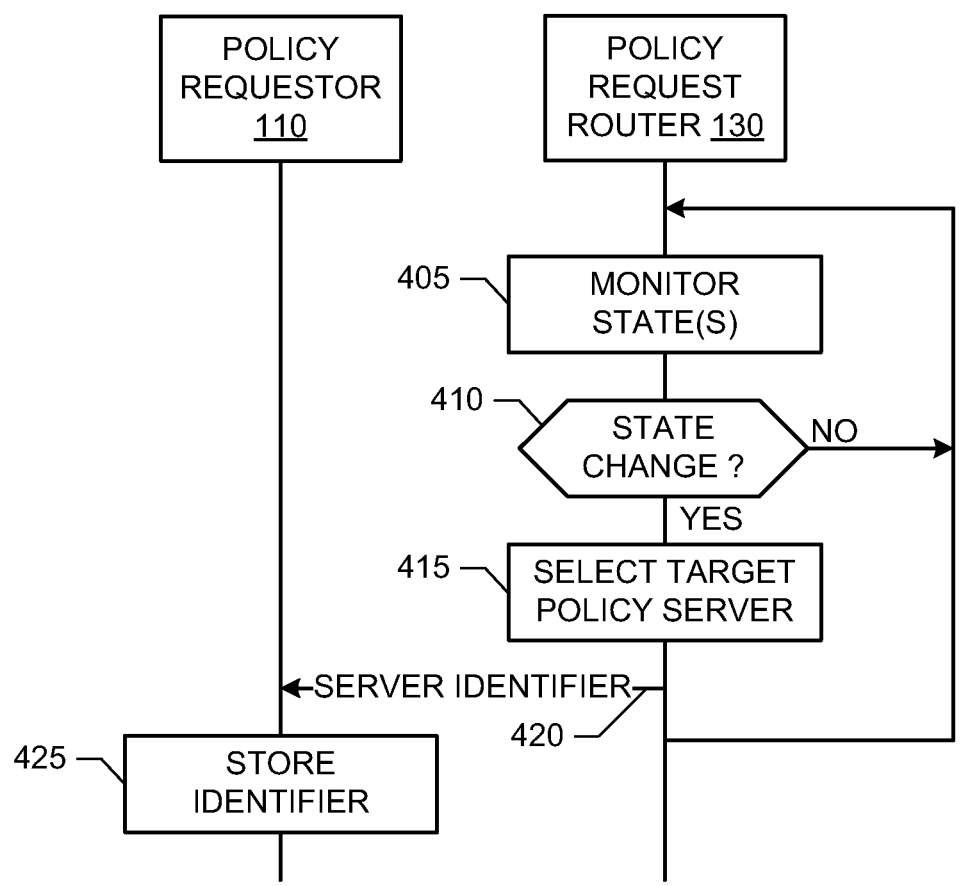
Figure 5:
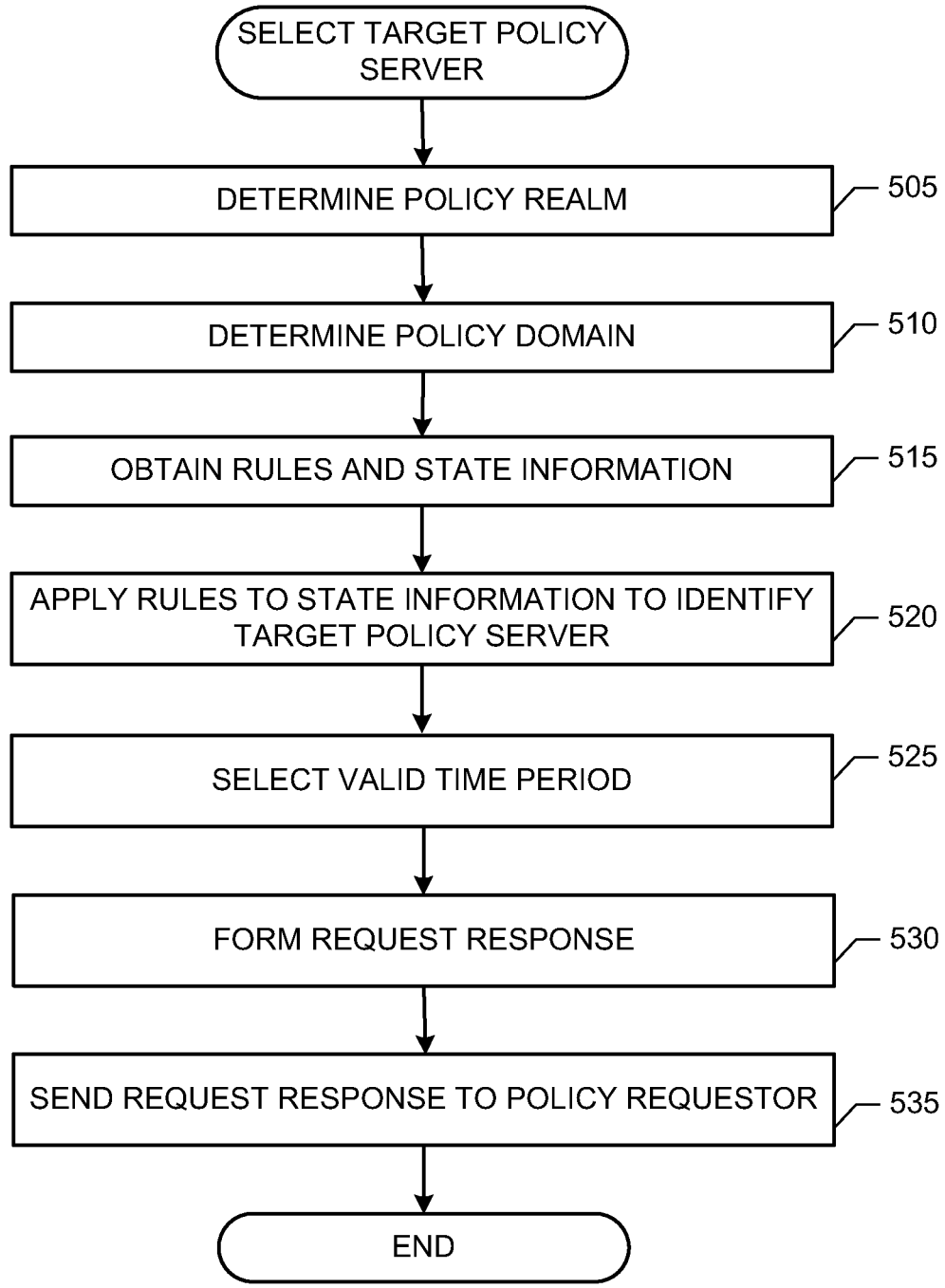

FIGS. 3, 4 and 5 illustrate example interactions and example processes that may be embodied as machine-accessible instructions and executed by, for example, one or more processors to implement the example policy requestors 110 and/or the example policy request router 130 of FIGS. 1 and 2. A processor, a controller and/or any other suitable processing device may be used, configured and/or programmed to execute the example machine-readable instructions represented in FIGS. 3-5. For example, the machine-readable instructions of FIGS. 3-5 may be embodied in coded instructions stored on a tangible computer-readable medium. Machine-readable instructions comprise, for example, instructions that cause a processor, a computer and/or a machine having a processor to perform one or more particular processes. Alternatively, some or all of the example processes of FIGS. 3-5 may be implemented using any combination(s) of ASIC(s), PLD(s), FPLD(s), FPGA(s), discrete logic, hardware, firmware, etc. Also, some or all of the example processes of FIGS. 3-5 may be implemented manually or as any combination of any of the foregoing techniques, for example, any combination of firmware, software, discrete logic and/or hardware. Further, many other methods of implementing the example operations of FIGS. 3-5 may be employed. For example, the order of execution of the blocks may be changed, and/or one or more of the blocks described may be changed, eliminated, sub-divided, or combined. Additionally, the blocks of any or all of the example processes of FIGS. 3-5 may be carried out sequentially and/or carried out in parallel by, for example, separate processing threads, processors, devices, discrete logic, circuits, etc.

The illustrated example of FIG. 3 begins with the example routing module 205 of one of the policy requestors 110 determining whether the cache 215 contains a valid entry for a policy request (block 305). If the cache 215 does not contain a valid entry (block 305), the routing module 205 sends the policy request 310 to the policy request router 130.

The routing engine 140 applies one or more of the policy routing rules 145 to select a policy server 115-117 for the policy request 310 (block 315). An example process that may be carried out by the example routing engine 140 to select the policy server 115-117 is illustrated in FIG. 5. The routing engine 140 returns to the policy requestor 110 an identifier 320 representing the selected policy server 115-117. The routing module 205 stores the identifier 320 in the server cache 215 (block 325) and sends the policy request 310 to the selected policy server 115-117 based on the received identifier 320. Control then exits from the example process of FIG. 3.

Returning to block 305, if the cache 215 contains a valid entry for the policy request 310 (block 305), the routing module 205 sends the policy request 310 to the policy server 115-117 without consulting the policy request router 130. Control then exits from the example process of FIG. 3.

The illustrated example of FIG. 4 begins with the example communication module 135 collecting network and/or policy server state information (block 405). If the routing engine 140 determines a state change has occurred that would result in selection of a different policy server 115-117 (block 410), the routing engine 140 applies one or more of the policy routing rules 145 to select a new policy server 115-117 for the policy request 310 (block 415). An example process that may be carried out by the example routing engine 140 to select the policy server 115-117 is illustrated in FIG. 5. The routing engine 140 provides to the policy requestor 110 an identifier 420 representing the selected policy server 115-117. The routing module 205 stores the identifier 420 in the server cache 215 (block 425). Control then returns to block 405 to continue collecting network and/or policy server state information.

The example process of FIG. 5 begins with the example routing engine 140 determining a policy realm (block 505) and a policy domain (block 510) for a received policy request (e.g., the example policy request 310 of FIG. 3). The routing engine 140 retrieves from the policy routing rules cache 145 the policy routing rules applicable to the policy realm and policy domain (block 515). The routing engine 140 applies the policy routing rules to the state information 160 and the policy request to identify a target policy server 115-117 (block 520). If applicable, the routing engine 140 selects and/or determines a valid time period for the target policy server 115-117 (block 525). The routing engine 140 forms a response (e.g., the example response 320 of FIG. 3) containing an identifier (e.g., a URL, a domain name, an IP address, etc.) representing the target policy server 115-117 and a time period value (if applicable) (block 530), and sends the response to the policy requestor 110 (block 535). Control then exits from the example process of FIG. 5.

Figure 6:
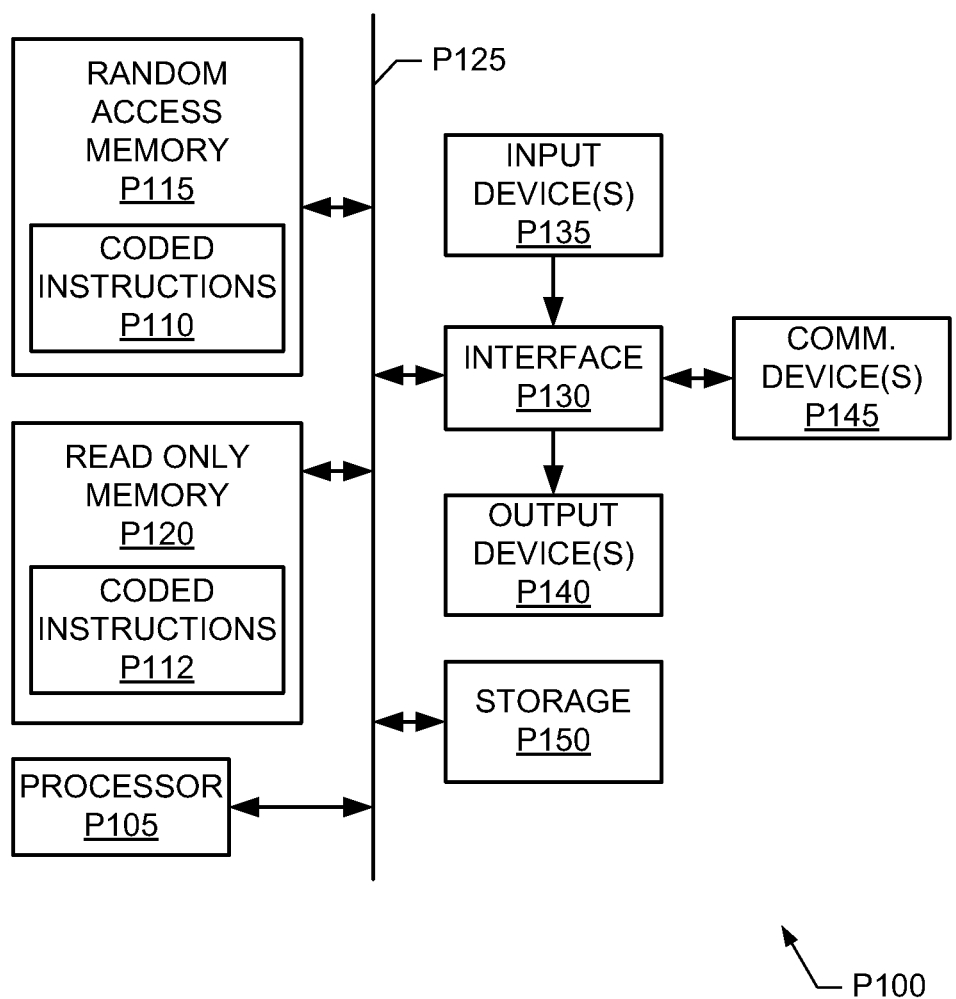
FIG. 6 is a schematic illustration of an example processor platform that may be used and/or programmed to execute the example machine-accessible instructions represented by FIGS. 3-5 to implement the example network of FIG. 1.

FIG. 6 is a block diagram of an example processor platform P100 that may be used and/or programmed to execute the example interactions and/or the example instructions of FIGS. 3-5 to implement any of the example policy requestors 110 and the example policy request routers 130 of FIGS. 1 and 2. One or more general-purpose processors, processor cores, microcontrollers, etc may be used to implement the processor platform P100. The processor platform P100 can be, for example, a server, a workstation, a router, a network switch, and/or any other type of computing device containing a processor.

The processor platform P100 of the instant example includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 3-5 to implement route policy requests. Thus, the coded instructions P110, P112 may include the example instructions of FIGS. 3-5.

The processor P105 is in communication with the main memory including a ROM P110 and the RAM P115 via a bus P125. The RAM P115 may be implemented by Synchronous Dynamic Random Access Memory (SDRAM), Dynamic Random Access Memory (DRAM), RAMBUS Dynamic Random Access Memory (RDRAM) and/or any other type of RAM device. The ROM P110 may be implemented by flash memory and/or any other desired type of memory device. Access to the memory P115 and the memory P120 may be controlled by a memory controller. The example memory P115 and P120 may be used to, for example, store the example caches 145, 155, 160 and 215 of FIGS. 1 and 2 and/or the example router address 210 of FIG. 2.

The processor platform P100 also includes an interface circuit P130. Any type of interface standard, such as an external memory interface, serial port, general-purpose input/output, as an Ethernet interface, a universal serial bus (USB), and/or a PCI express interface, etc, may implement the interface circuit P130.

One or more input devices P135 may be connected to the interface circuit P130. The input device(s) P135 may be used to, for example, permit a user to enter data and commands into the processor P105. The input device(s) P135 can be implemented by, for example, a keyboard, a mouse, a touchscreen, a track-pad, and/or a trackball.

One or more output devices P140 are also connected to the interface circuit 1020. The output devices P140 can be implemented, for example, by display devices (e.g., a liquid crystal display, a cathode ray tube display (CRT), and/or a printer). The interface circuit P130 may, thus, include a graphics driver card.

The interface circuit P130 may also includes one or more communication device(s) 145 such as a network interface card to facilitate exchange of data with external computers via a network. For example, the communication device(s) 145 may implement the example communication modules 135 of FIG. 1.

In some examples, the processor platform P100 also includes one or more storage devices P150 to store software and data. Examples of such storage devices P150 include a floppy disk drive, a hard disk drive, a solid-state hard disk drive, a CD drive, a DVD drive and/or any other solid-state, magnetic and/or optical storage device. The example storage 150 may be used to, for example, store the example caches 145, 155, 160 and 215 of FIGS. 1 and 2, the example router address 210 of FIG. 2, and/or the example coded instructions of FIGS. 3-5.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
applying, at a policy request router, a rule based on a parameter representing a network condition to select a first policy server for a first policy request received from a policy requestor;
sending from the policy request router to the policy requestor a first duration and a first identifier representing the first policy server, the policy requestor to send the first policy request to the first policy server based on the first identifier, the first policy server to enforce a first policy associated with the first policy request, the policy requestor to send first subsequent policy requests after the first policy request to the first policy server based on the first identifier until the first duration has expired and to send a second subsequent policy request to the policy request router after the first duration has expired; and
when the second subsequent policy request is received from the policy requestor at the policy request router, sending from the policy request router to the policy requestor a second duration and a second identifier representing a second policy server, the second policy server different from the first policy server.

2. The method as defined in claim 1, further comprising:
applying, at the policy request router, a second rule based on a second parameter representing a second network condition to select the second policy server when the second subsequent policy request is received from the policy requestor, the second rule being different from the first rule, the second policy server to enforce a second policy associated with the second policy request, the second policy being different from the first policy.

3. The method as defined in claim 1, further comprising:
detecting a network state change prior to the first duration expiring; and
in response to detecting the network state change, applying the rule at the policy request router to select the second policy server for the second subsequent policy request, the second policy server to enforce the first policy.

4. The method as defined in claim 1, wherein the rule comprises an if X while Y then Z rule, Y being the network condition, and X being determined based on the first policy request.

5. The method as defined in claim 1, further comprising:
determining a policy realm based on the first policy request;

determining a policy domain based on the policy realm; and selecting the rule from a plurality of rules associated with the policy domain.

6. The method as defined in claim 5, wherein the policy realm comprises a quality of service realm.

7. The method as defined in claim 5, wherein the policy domain comprises a geographic area.

8. The method as defined in claim 5, wherein the policy comprises a quality of service policy.

9. A policy request router comprising:

a memory comprising machine readable instructions; and a processor to execute the instructions to perform operations comprising:

applying a rule based on a value representing a network condition to select a policy server for a first policy request received from a policy requestor;

sending to the policy requestor a first duration and a first identifier representing the first policy server to thereby cause the policy requestor to send the first policy request to the first policy server based on the first identifier, the first policy server to enforce a policy associated with the first policy request, the policy requestor to send a subsequent policy request to the first policy server based on the first identifier if the first duration has not expired and to send the subsequent policy request to the policy request router if the first duration has expired; and when the second policy request is received from the policy requestor, sending to the policy requestor a second duration and a second identifier representing a second policy server.

10. The policy request router as defined in claim 9, wherein the operations further comprise:

storing network state information in a state cache;

detecting a network state change prior to the first duration expiring by querying the state cache; and in response to detecting the network state change, selecting the second policy server for the second policy request, the second policy server to enforce the first policy.

11. The policy request router as defined in claim 9, wherein the operations further comprise:

storing policy selection rules in a policy cache;

determining a policy domain based on the policy request; and selecting the rule from the policy cache based on the policy domain.

12. The policy request router as defined in claim 11, wherein the operations further comprise storing network state information in a state cache and selecting the network condition from the state cache based on the first policy request.

13. A machine-readable hardware storage device comprising instructions that, when executed, cause a machine to perform operations comprising:

applying a rule based on a parameter representing a network condition to select a first policy server for a first policy request received from a policy requestor; and sending a first duration and a first identifier representing the first policy server to the policy requestor, the policy requestor to send the first policy request to the first policy server based on the first identifier, the first policy server to enforce a first policy associated with the first policy request, the policy requestor to send a subsequent policy request to the first policy server based on the first identifier if the first duration has not expired and to send the subsequent policy request to a policy request router if the first duration has expired; and when the second policy request is received from the policy requestor sending a second duration and a second identifier representing a second policy server to the policy requestor.

14. The machine-readable hardware storage as defined in claim 13, wherein the operations further comprise:

applying a second rule based on a second parameter representing a second network condition to select the second policy server when the subsequent policy request is received from the policy requestor, the second rule being different from the first rule, the second policy server to enforce a second policy associated with the subsequent policy request, the second policy being different from the first policy.

15. The machine-readable hardware storage device as defined in claim 13, wherein the operations further comprise:

detecting a network state change prior to the first duration expiring; and when the network state change is detected, applying the rule to select the second policy server for the second policy request, the second policy server to enforce the first policy.

16. The machine-readable hardware storage device as defined in claim 13, wherein the rule comprises an if X while Y then Z rule, Y being the network condition, and X being determined based on the first policy request.

17. The machine-readable hardware storage device as defined in claim 13, wherein the operations further comprise:

determining a policy realm based on the first policy request;

determining a policy domain based on the policy realm; and selecting the rule from a plurality of rules associated with the policy domain.

18. The machine-readable hardware storage device as defined in claim 13, wherein the operations further comprise:

in response to detecting a network state change, selecting the first duration to be a time period after which the policy requestor is to send the second policy request to the policy request router.

* * * * *